(12) United States Patent
Malomsoky et al.

(10) Patent No.: US 8,514,723 B2
(45) Date of Patent: Aug. 20, 2013

(54) TRAFFIC MONITORING BY LOWEST TRANSMISSION LAYER MARKING

(75) Inventors: Szabolcs Malomsoky, Szentendre (HU); Tamas Borsos, Budapest (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 337 days.

(21) Appl. No.: 12/996,434

(22) PCT Filed: Jun. 5, 2008

(86) PCT No.: PCT/EP2008/056995
§ 371 (c)(1),
(2), (4) Date: Dec. 6, 2010

(87) PCT Pub. No.: WO2009/146747
PCT Pub. Date: Dec. 10, 2009

(65) Prior Publication Data
US 2011/0080835 A1    Apr. 7, 2011

(51) Int. Cl.
*H04L 12/26* (2006.01)
(52) U.S. Cl.
USPC ............................................. 370/241
(58) Field of Classification Search
USPC .................... 370/229–253, 466, 467, 474
See application file for complete search history.

(56) References Cited

U.S. PATENT DOCUMENTS

| 5,699,521 | A  | * | 12/1997 | Iizuka et al. ................... 709/240 |
| 6,920,112 | B1 |   | 7/2005  | McCloghrie et al. |
| 7,307,968 | B2 | * | 12/2007 | Niemela et al. ............... 370/329 |
| 2002/0181468 | A1 | * | 12/2002 | Lucidarme et al. ........ 370/395.2 |
| 2007/0076606 | A1 | * | 4/2007  | Olesinski et al. ............. 370/230 |
| 2008/0097725 | A1 | * | 4/2008  | Knodle et al. ................. 702/188 |
| 2009/0245129 | A1 | * | 10/2009 | Pongracz et al. ............. 370/253 |
| 2010/0182907 | A1 | * | 7/2010  | Pinter et al. ................... 370/235 |

OTHER PUBLICATIONS

International Search Report for PCT/EP2008/056995, mailed Apr. 17, 2009.
International Preliminary Report on Patentability for PCT/EP2008/056995, mailed Mar. 22, 2010.

* cited by examiner

*Primary Examiner* — Charles C Jiang
(74) *Attorney, Agent, or Firm* — Nixon & Vanderhye P.C.

(57) ABSTRACT

A monitoring system is provided for monitoring transport of data through interconnected nodes for processing data packets in a communication system, wherein said data packets conform to a layered transmission protocol, the system comprising: (1) a marking node for marking a packet selected according to a marking rule by placing a monitoring indicator in the lowest protocol layer thereof, said data packet having a first number of protocol layers, (2) at least, one packet processing node for forming a data packet based or the marked packet, such that said formed data packet comprises a second number of protocol layers that is different from said first number of protocol layers and such that said indicator is in the lowest protocol layer of said formed data packet, and (3) a monitoring node for monitoring said transport of data on the basis of the indicators in data packets that have passed through the at least one packet processing node.

15 Claims, 14 Drawing Sheets

TRAFFIC MONITORING BY LOWEST TRANSMISSION LAYER MARKING

This application is the U.S. national phase of International Application No. PCT/EP2008/056995 filed 5 Jun. 2008 which designated the U.S., the entire contents of which is hereby incorporated by reference.

TECHNICAL FIELD

The invention relates to a system and a method for monitoring transport of data through interconnected nodes in a communication system, in particular wherein data packets conform to a layered transmission protocol. The present application is for example applicable in 3GPP networks.

DEFINITIONS

The term "data" is used in the present application in a generic way and describes any digital code representing information. Thus, data may represent a part or the whole of one or more of, e.g., as voice signal, a video signal, an alphanumeric file transfer, a communications control signal, etc.

The term "packet" is used in the present application in a generic way, and describes any subdivision of data in an overall stream. Such a packet can have different names in connection with different protocols and technologies, such as message, frame, data unit, protocol data unit, service data unit, cell, block, segment, etc. Furthermore, a packet may have one or more protocol layers in connection with different technologies and protocols, e.g., Internet Protocol (IP).

The term "flow" is used in the present application in a generic way to mean a group of related packets. Such packets may all have the same identifier that indicates that the packets are related by, e.g., (i) all belonging to the same communication; (ii) all belonging to the same user or user group; or (iii) all comprising data of the same application.

ABBREVIATIONS

3G—Third Generation
3GPP—Third Generation Partnership Project
CRC—Cyclic Redundancy Check
GGSN—Gateway GPRS Support Node
GPRS—Generic Packet Radio Service
GTP—GPRS Tunneling Protocol
HSDPA—High Speed Downlink Packet Access
IMSI—International Mobile Subscriber Identity
IP—Internet Protocol
Lx—Layer x (e.g., L1, L2)
MAC—Medium Access Control
MS—Mobile Station
Node-B—The name of the base station in 3G
PS—Packet Switched
PDCP—Packet Data Convergence Protocol
RLC—Radio Link Control
RNC—Radio Network Controller
SGSN—Serving GPRS Support Node
TOS—Type of Service
UDP—User Datagram Protocol
UMTS—Universal Mobile Telecommunications System
UTRAN—UMTS Terrestrial Radio Access Network

BACKGROUND

In passive monitoring, performance measurements are obtained by carrying out passive measurements within the network. In contrast, subscriber terminal-based monitoring characterises subscriber satisfaction by carrying out performance measurements directly in the terminal of a subscriber.

By way of example, for passive measurement in the network, the network traffic may be captured at certain interfaces in the network, and performance indicators may be obtained by processing this information. Performance indicators are possible to define such that end-user perceived quality is well-approximated by the indicators.

Even though subscriber-perceived performance can generally be best observed in the subscriber terminal, a passive monitoring system for carrying out measurement in the network may have the following advantages:

no specific terminals are needed;
all terminals in a live network can be observed;
cost-efficient large-scale monitoring is possible, because a few measurement points can cover a large part of a network;
not only user-perceived performance can be observed, but also the traffic composition and volume (e.g., the most popular applications, the traffic demands of typical or power users, etc.); and
by appropriate placing of the measurement points, it is possible to localize faults or find the cause of performance degradations (e.g., bottlenecks).

Passive monitoring-based performance/fault analysis and traffic modeling is therefore becoming an increasingly important part of network audit and management services.

However, as access rates increase and prices of services fall, an increased number of subscribers start to use more bandwidth-hungry applications. Consequently, passive monitoring becomes more difficult.

It is an object of the present application to provide improved systems and methods for monitoring transport of data in a generalised communications system wherein data packets conform to a layered transmission protocol.

SUMMARY

According to a first aspect of the present invention, there is provided a monitoring system for monitoring transport of data through interconnected nodes for processing data packets in a communication system, wherein said data packets conform to a layered transmission protocol, the monitoring system comprising: (1) a marking node for selecting a data packet according to a marking rule and marking the selected packet by placing in the lowest protocol layer thereof a monitoring indicator for identifying that said selected packet is to be used for said monitoring, said data packet having a first number of protocol layers, and outputting said marked data packet, (2) at least one packet processing node for receiving said marked data packet, forming a data packet based on said received marked data packet, such that said formed data packet comprises a second number of protocol layers that is different from said first number of protocol layers and such that said indicator added by said marking node is in the lowest protocol layer of said formed data packet, and outputting said formed data packet, and (3) a monitoring node for monitoring said transport of data on the basis of the indicators in data packets that have passed through the at least one packet processing node.

According to a second aspect of the present invention, there is provided a monitoring method for monitoring transport of data through interconnected nodes for processing data packets in a communication system, wherein said data packets conform to a layered transmission protocol, the monitoring method comprising: (1) in a marking node, selecting a data packet according to a marking rule and marking the selected packet by placing in the lowest protocol layer thereof a monitoring indicator for identifying that said selected packet is to be used for said monitoring, said data packet having a first number of protocol layers, and outputting said marked data packet, (2) in at least one packet processing node, receiving said marked data packet, forming a data packet based on said received marked data packet, such that said formed data packet comprises a second number of protocol layers that is different from said first number of protocol layers and such that said indicator added in said marking node is placed in the lowest protocol layer of said formed data packet, and outputting said formed data packet, and in a monitoring node, monitoring said transport of data on the basis of the indicators in data packets that have passed through the at least one packet processing node.

Preferred embodiments are defined in the appended dependent claims.

BRIEF DESCRIPTION OF THE DRAWINGS

Embodiments of the invention will be described below, by way of example only, with reference to the accompanying drawings, in which.

DETAILED DESCRIPTION OF NON-LIMITING EXAMPLE EMBODIMENTS

According to preferred embodiments, the concepts below are applicable in a passive monitoring system such as described above. However, the above advantages of a passive monitoring system are naturally only examples, and the present invention can be used in connection with any communication system in which data packets having protocol layers are transported.

Figure 1:
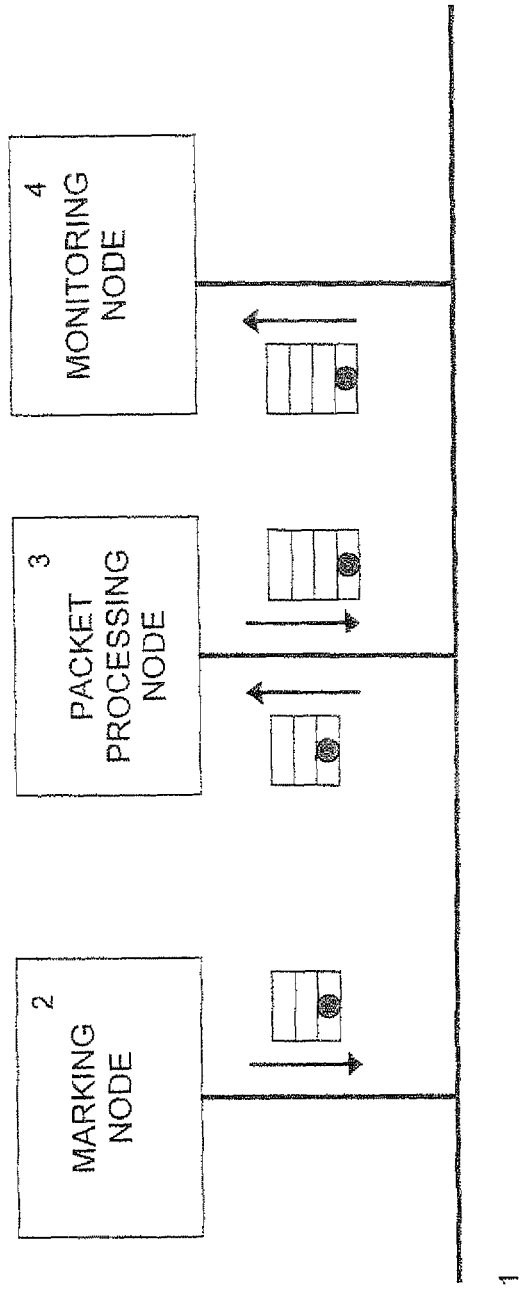
FIG. 1 schematically shows components of a first, system embodiment of the invention, including notional functional units into which the system may be thought of as being configured.

Examples of co-operation of functional units of embodiments are described below with reference the drawings. As is the case for all of the apparatus drawings, the illustrated units and interconnections are notional and are shown for illustration purposes only to assist understanding; they do not necessarily represent units and connections into which apparatus or software of the system actually become configured. For example, although FIG. 1 shows three separate nodes 2-4, the nodes 2 and 3, or the nodes 3 and 4, or all three nodes 2-4, may be integrated within one node. Further still, the drawings are not intended to suggest whether any functional unit is implemented in software or hardware, or to specify whether packets are processed in parallel or serially any point. Further still, the monitoring node 4 may be connected to the communications medium, e.g., network 1, indirectly through the packet processing node 3.

The following descriptions of example embodiments refer to "identifiers" in packets and flows.

Regarding a "flow" as described above, the identifier found in a packet thereof may for example identify particular source and/or destination ports, or a particular user/user group. Alternatively, such an identifier may identify a particular communication that is, e.g., a telephone conversation, an SMS text message, a file transfer, a communications system control message, etc. Further alternatively, such an identifier may identify a particular application that is, e.g., conventional packet switched PSTN telecommunication, Voice-Over-IP (VoIP) telecommunication, SMS texting, etc.

However, it will be obvious to the skilled person that many other types of identifier may be used to identify a flow. Furthermore, it would be obvious to the skilled person that an identifier may be merely a number or a code for identifying a flow by means of a look-up table or database.

Such an identifier in a particular packet of a flow may further uniquely identify the particular packet. For example, the identifier may identify an associated, serial flow of packets and further comprise a packet sequence number that indicates the sequential position of the packet in the identified, serial flow.

For a single packet that is not part of a flow comprising a group of packets, an identifier in the single packet may uniquely identify the single packet.

Where a packet comprises more than one protocol layer, an identifier may generally be located in any one of those protocol layers, depending on the particular protocol or technology, or on the part of the communications system through which the packet is currently being transported.

FIRST NON-LIMITING EXAMPLE EMBODIMENT

Referring to FIG. 1, a system embodiment of the present invention comprises a marking node 2, a packet processing node 3 and a monitoring node 4. These nodes may be linked by any communications medium, e.g., network 1.

Referring to specific functional units shown in FIG. 1, the marking node 2 is configured to select packets according to a marking rule and to mark the or each selected packet by placing a monitoring indicator in the lowest protocol layer of the packet (which may be the only protocol layer). Preferably, the lowest layer is the lowest networking layer, e.g., the lowest Internet Protocol (IP) transport layer.

Thus, the marking rule is any rule for determining which packets are selected for marking, e.g., by requiring each selected packet to have an identifier matching a predetermined identifier, or even by requiring packets to be marked to be selected randomly. The marking rule may further specify how a selected packet is to be marked, e.g., the form of a monitoring indicator to be placed in the packet, and/or where (e.g., in which field) the monitoring indicator is to be placed within the lowest protocol layer.

The monitoring indicator may comprise one or more bits, and is for indicating that the selected packet is to be used for monitoring. Where the monitoring indicator comprises a plurality of bits, the monitoring indicator may further identify the packet itself or a flow to which the packet belongs, e.g., the indicator may be an identifier as described above.

The packet processing node 3 changes the number of protocol layers of the marked packet while ensuring that the lowest protocol layer (e.g., the lowest IF transport layer) of the resulting number of layers contains the monitoring indicator placed by the marking node. Advantageously, this can allow the monitoring indicator placed by the marking unit 2 in the lowest protocol layer of a packet to be propagated such that the indicator remains in the lowest protocol layer even when the number of protocol layers of the packet is changed. Further advantageously, where all the nodes in a communications route extending from the marking node 2 are nodes that do not change the number of protocol layers and/or packet processing nodes 3, the monitoring indicator of a packet marked by the marking node 2 remains in the lowest protocol layer of the packet as the packet propagates through the entire route, regardless of any changes in the number of protocol layers in the packet. Consequently, the monitoring indicator of a marked packet remains available, and may further remain more easily accessible, throughout the propagation of the packet along the entire route, without any need to parse into other, e.g., higher, protocol layers as well as the lowest protocol layer at any point along the route.

The monitoring node 4 is configured to perform monitoring of data transport on the basis of the packet(s) marked by the marking node 2 and processed by the packet processing node 3. Thus, the monitoring node may monitor the transport of data carried by a single marked packet or data carried by a flow of related marked packets.

In particular, the monitoring node 4 may be configured to, for identifying packet(s) to be processed for monitoring transport of a particular packet or flow, i.e., packets marked by a marking node 2, look only in the lowest protocol layer (e.g., lowest IP transport layer) of each received packet.

The network 1 may be any communications network that uses any physical transport mechanism (e.g. wired, wireless, optical, etc.) and any layered transport protocol (e.g., TCP-IP, SDH, SONET, etc.).

Thus, an embodiment may have a first node (marker node 2) which applies a monitoring indicator according to a marking rule, a second node (packet processing node 3) which propagates the indicator by ensuring that the indicators are placed in the lowest protocol layer of the outgoing packet, and a third node (monitoring node 4) that can monitor the traffic based on the indicator. Advantageously, this can allow large-scale monitoring, which may be applicable to different kinds of activities such as performance monitoring.

Preferably, the monitoring node 4 may be configured to perform the transport monitoring on the basis, of marked packets that comprise a monitoring indicator conforming to a monitoring rule. Such a rule may, e.g., specify that the monitoring indicator must match a predetermined monitoring indicator, or specify that all packets containing a monitoring indicator are to be used for the monitoring, as further described below.

Furthermore, there may be one or more further nodes 2-4 of the invention or conventional nodes connected in the system, e.g., on network 1, beyond or between any of the nodes 2-4 of FIG. 1. Preferably, any such conventional node between the marking and monitoring nodes should not add to a received packet a protocol layer lower than the lowest protocol layer of the packet as received in the conventional node.

Examples of co-operation of functional units within the nodes 2-4 of the first system embodiment are described below with reference the drawings Any of the nodes 2-4 may have, in addition to functional units required for performing the invention, further functional units configured to perform the functions of any conventional communications system node. For example, the packet processing node 3 may have functional units for performing conventional routing, switching, priority queuing, buffering, etc., in addition to the functional units of nodes 2-4 as described above. As a further example, the functional units of the marking node 2 or monitoring node 4 may be provided together with conventional functional units of a user terminal, e.g., a mobile telephone. Functional units for performing conventional functions may be further provided in an integrated manner with, or separately from, functional units concerned with performing the invention.

Figure 2:
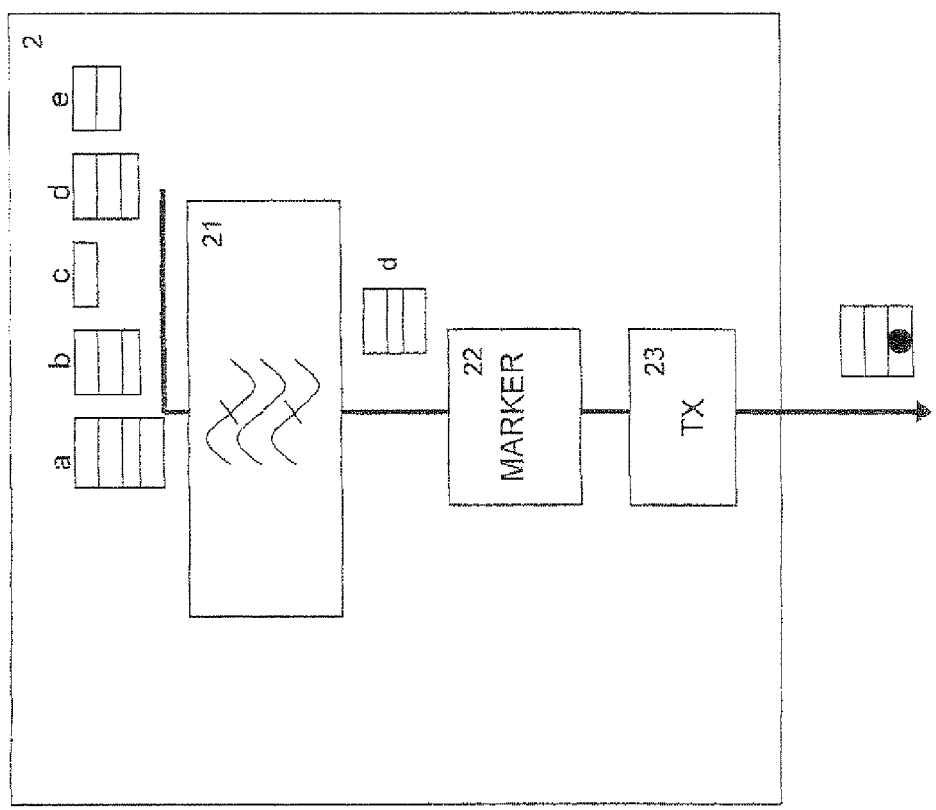
FIG. 2 shows notional functional units of which the marking node 2 of FIG. 1 may be configured.

FIG. 2 shows that the marking node 2 may comprise a filter for selecting packets (e.g., from packets a-e) to be marked according to the marking rule. The filtering may be carried out by first searching for an identifier (e.g., user identifier, destination port, etc.) within each packet and, then selecting packets by comparing the identifiers to a predetermined identifier specified by the marking rule. (If the packet originates, i.e., is generated, at the marking node 2, the searching may not need to be carried out). The filter is arranged to output the selected packets to a marker unit 22 that is for marking each selected packet by ensuring that a monitoring indicator is placed in the lowest (or only) protocol layer of the selected packet. If the monitoring indicator is to be identical to the identifier, the marker unit 22 may be configured to place the monitoring indicator only after determining that the identifier is not already present in the lowest protocol layer.

In one example, the monitoring indicator is the same as the identifier. In this case, for placing a monitoring indicator in the lowest protocol layer of a packet, the marker unit 22 may be arranged to identify the protocol layer in which the identifier of a packet is located and, if it is determined that this is not the lowest protocol layer, to copy or move the indicator into the lowest layer. The marker unit 2 need not copy or move the indicator for placing it if it is detected that the identifier is already in the lowest layer.

Marker unit 22 outputs marked packets to transmitter 23 for outputting from the marking node 2.

Figure 3:
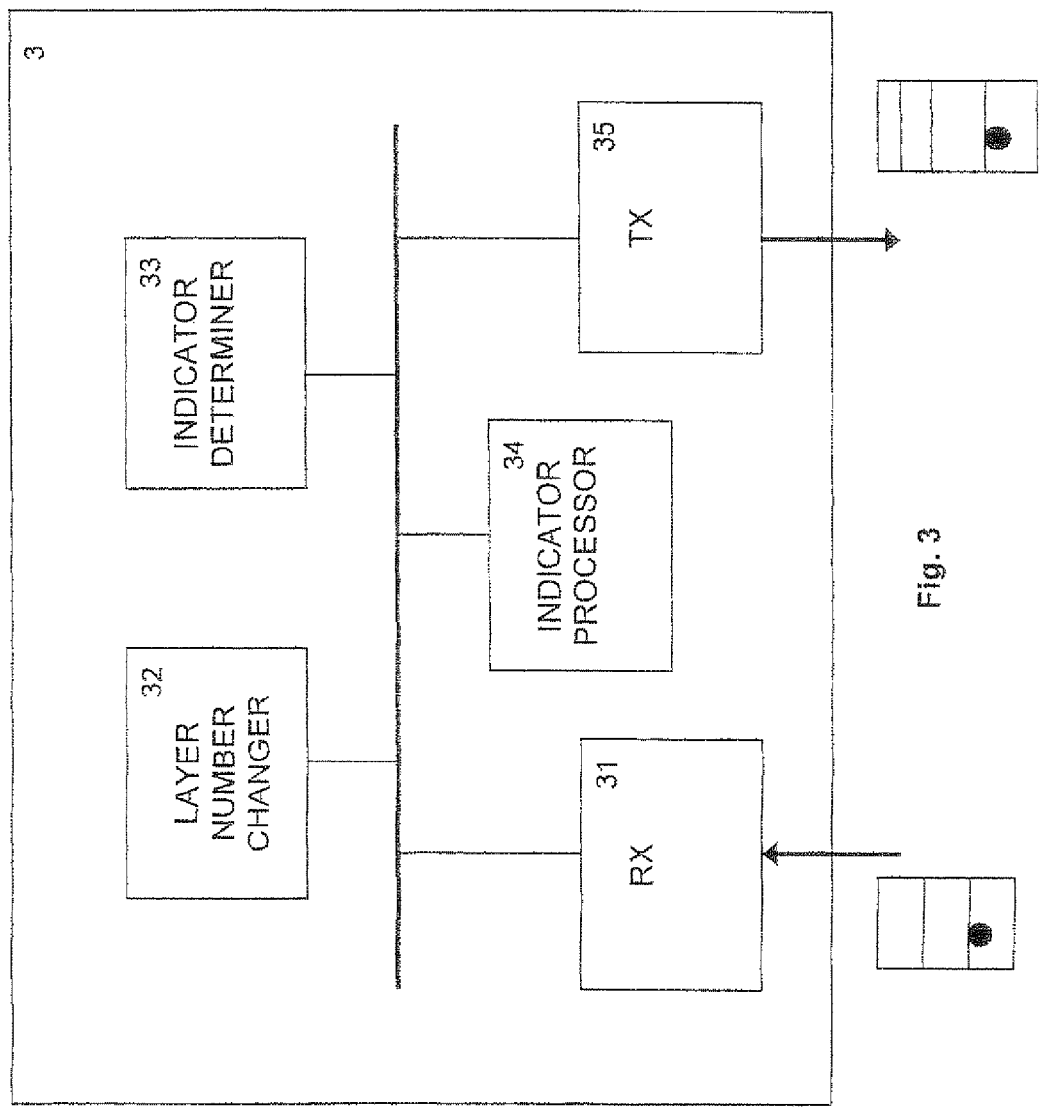
FIG. 3 shows notional functional units of which the packet processing node 3 of FIG. 1 may be configured.

FIG. 3 shows that the packet processing node 3 may have a configuration wherein a receiver 31 and transmitter 35 are linked by a layer number changer 32, an indicator determiner and an indicator processor 34. The receiver 31 is for receiving packets from, e.g., network 1, wherein at least some of the packets may have a monitoring indicator. The layer number changer 32 may add or remove one or more protocol layer(s) to/from a packet received in the packet processing node 3, depending on communications system requirements not directly related to the invention. The indicator determiner 33 is for determining if a monitoring indicator is present in a packet received from the layer number changer 32 and, if so, in which protocol layer the indicator is located. Depending on the output from the indicator determiner 33, the indicator processor 34 is arranged to ensure that any indicator detected and located by the determiner 31 is present in the lowest protocol layer when the packet is output to the transmitter 35. The transmitter 35 transmits the packet further in the communication system, e.g., on network 1.

In one particular configuration of the packet processing node of FIG. 3, the processing carried out by the changer 32, determiner 33 and processor 34 may be carried out as a series of steps in that order. Furthermore, the output of the determiner 33 may be used to ensure that packets without any monitoring indicator are not input to the processor 34 but passed straight to the transmitter 35.

Further still, the indicator processor 34 may ensure that an indicator is in the lowest layer as described above, by moving or copying the monitoring indicator to the lowest IP protocol layer of the packet, and may further by configured to not move or copy the indicator if the determiner 33 indicates that the indicator of a particular packet is already in the lowest layer of the packet output from the layer number changer.

Figure 4:
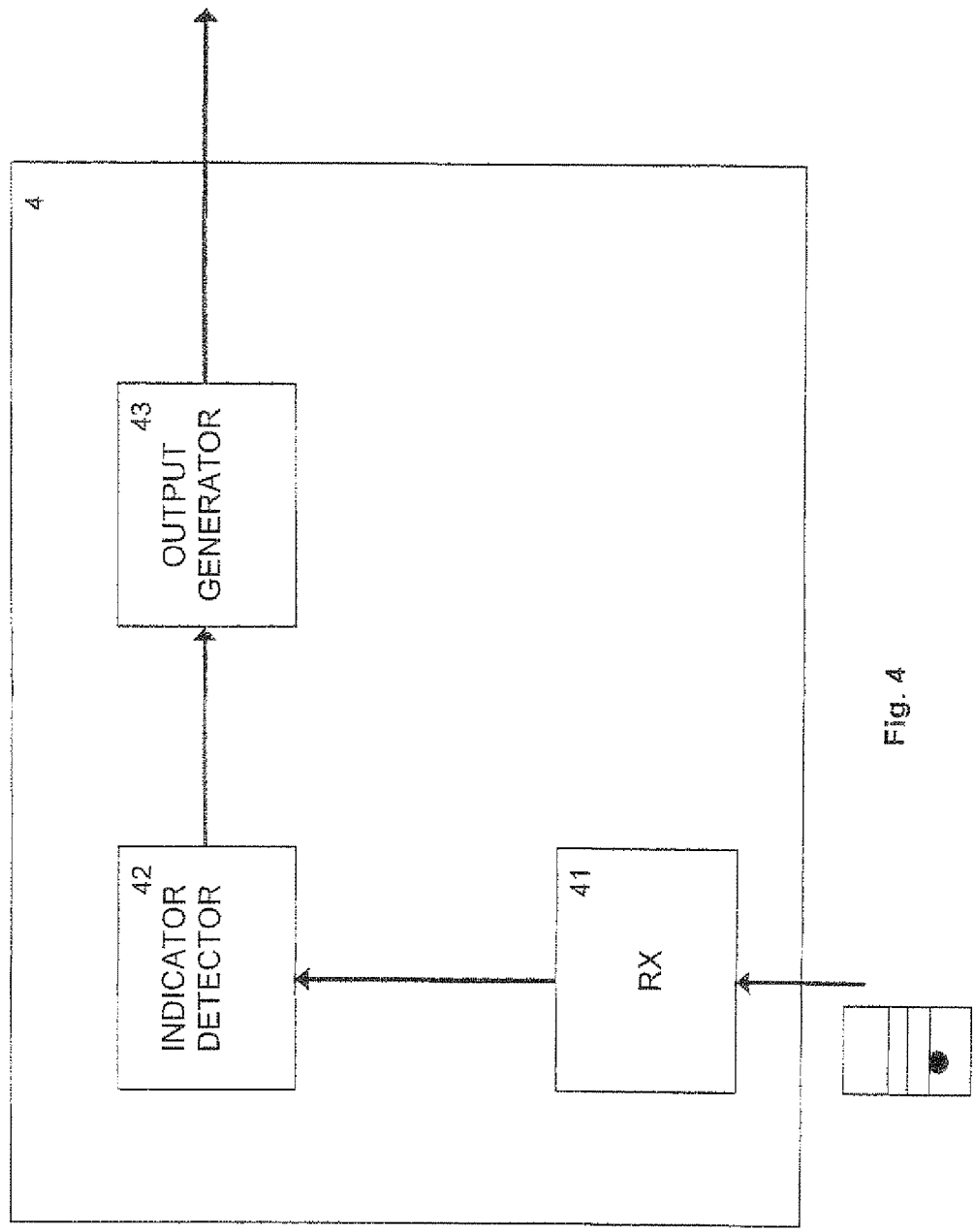
FIG. 4 shows notional functional units of which the monitoring node 4 of FIG. 1 may be configured.

FIG. 4 shows that the monitoring node 4 may have a configuration wherein a receiver 41 is provided for receiving packets, an indicator detector 42 is provided to detect whether a monitoring indicator is present in the lowest protocol layer of each received packet, and an output generator 43 is provided to generate and output monitoring results.

Furthermore, one or more additional instances of the monitoring node 4 may be provided, at different points within the system, to receive packets from the same marking node 2. Such monitoring nodes 4 may be advantageously arranged, e.g., to indicate lack of route diversity or for fault localisation by providing outputs that are processable to identify a particular locality, i.e., an area or link in a communications network where a fault has occurred leading to packet loss.

Figure 5:
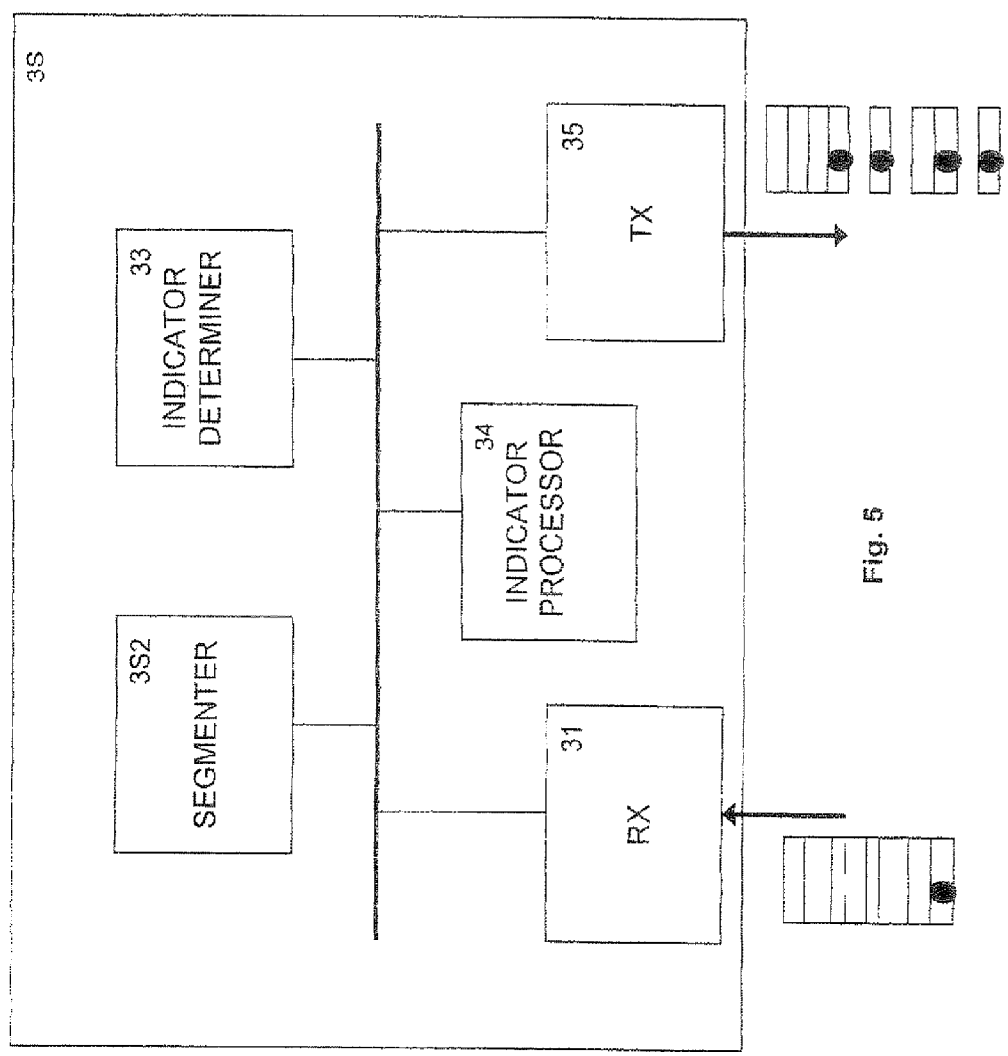
FIG. 5 shows notional functional units of which a segmenting packet processing node 35 may be configured.

FIG. 5 shows a segmenting packet processing node 3S, which may be an additional node in the system embodiment or may constitute the above packet processing node 3. The segmenting packet processing node 3S may have the configuration of the packet processing node 3 of FIG. 3 including the receiver 31, indicator determiner 33, indicator processor 34 and transmitter 35. However, the layer number changer 32 of the packet processing node 3 is replaced by a segmenter 3S2. The segmenter 3S2 is configured to change the number of layers of a packet by segmenting, i.e., dividing, a packet received by receiver 31 into a plurality of packets.

The indicator determiner 33 of the segmenting packet processing node 3A may be configured to determine whether the received packet contains a monitoring indicator and in which protocol layer that indicator is located within the received packet. On this basis, the indicator processor 34 is configured to copy any such monitoring indicator to the lowest protocol layer of each packet resulting from the segmentation. The processor 34 may further be configured not to copy the indicator to any one of the resulting packets if the determiner 33 indicates that the monitoring indicator is already present in the lowest layer of that particular packet.

Figure 6:
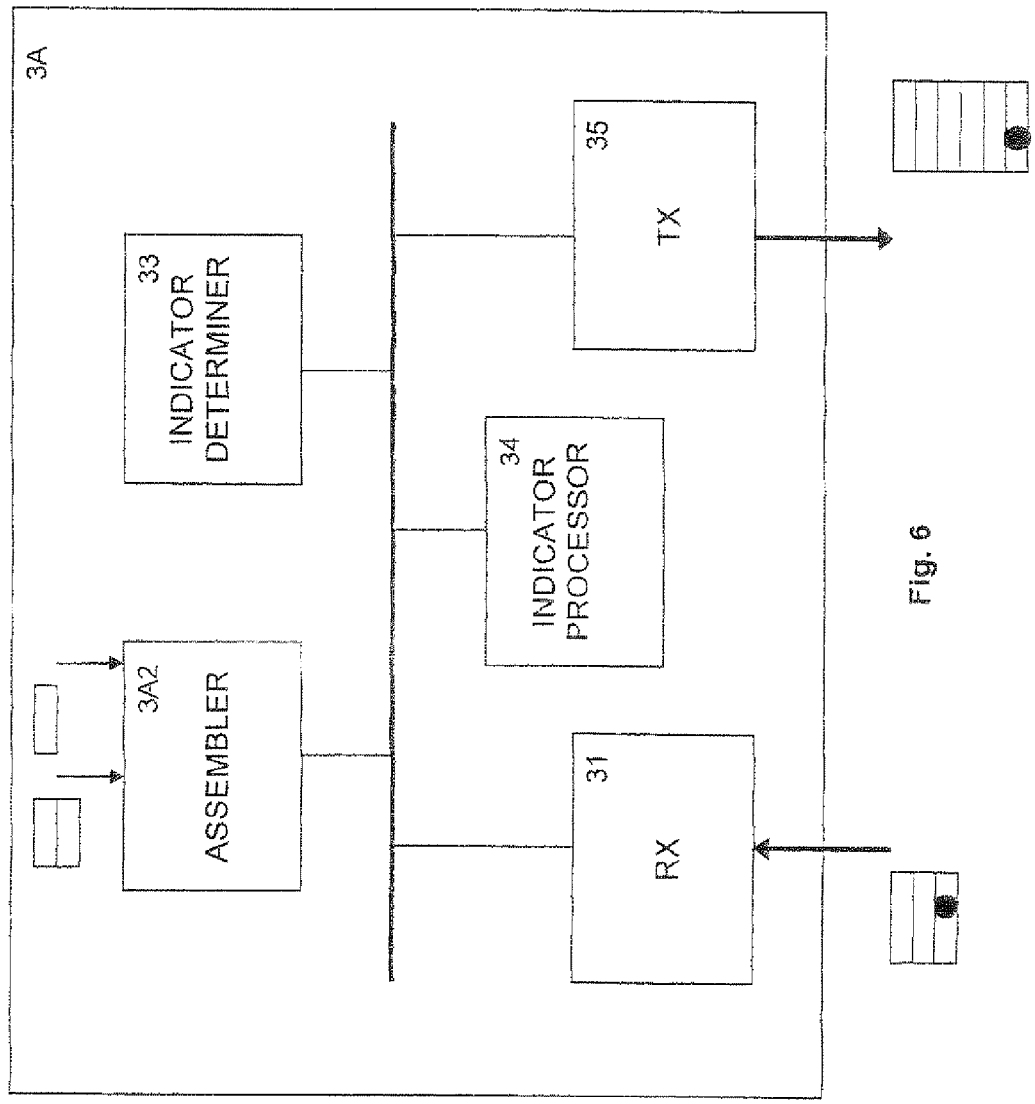
FIG. 6 shows notional functional units of which an assembling packet processing node 3A may be configured.

FIG. 6 shows an assembling packet processing node 3A, which may be an additional node in the system embodiment or may constitute the above packet processing node 3. The assembling packet processing node 3A may have the configuration of the packet processing node 3 of FIG. 3 including the receiver 31, indicator determiner 33, indicator processor 34 and transmitter 35. However, the layer number changer 32 of the packet processing node 3 is replaced by an assembler 3A2. The assembler 3A2 is configured to change the number of layers of a packet by assembling a packet from a packet received by receiver 31 and one or more other packets. The 'other' packet(s) may have been received in receiver 31 and/or be packets generated by the assembling packet processing node 3A. Alternatively, the 'other' packets may be received in a further receiver 31 of the assembling packet processing node 3A that receives packets from other communication channels or routes of a network 1.

The indicator determiner 33 of the assembling packet processing node 3A may be configured to determine whether the assembled packet contains a monitoring indicator and, if so, in which protocol layer. If the assembling packet processing node 3A is configured to form each assembled packet using only one packet received by receiver 31 (as opposed to generated or received by an alternative receiver), the determiner 33 may be configured to establish if there is one or no indicator within the assembled packet. Alternatively, the determiner 33 may be configured to detect one or more indicator(s) within the assembled packet and in which layer(s) of the assembled packet each such indicator is located.

The indicator processor 34 is configured to copy or move the or each monitoring indicator to the lowest protocol layer of the assembled packet. The processor 34 may further be configured not to copy an indicator to any one of the resulting packets if the determiner 33 indicates that the monitoring indicator is already present in the lowest layer of the assembled packet.

Figure 7:
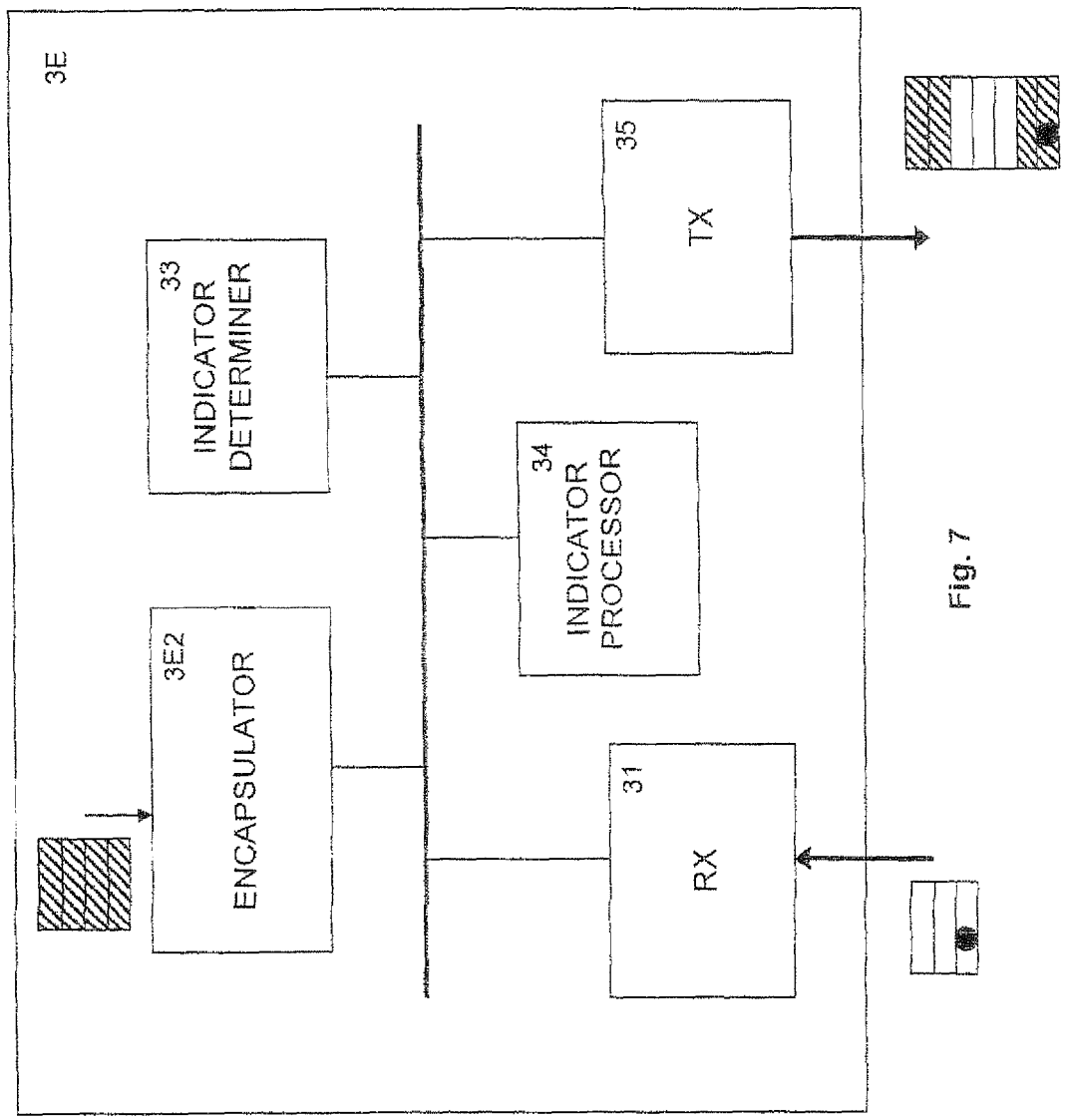
FIG. 7 shows notional functional units of which an encapsulating packet processing node 3E may be configured.

FIG. 7 shows an encapsulating packet processing node 3E, which may be an additional node in the system embodiment or may constitute the above packet processing node 3. As shown in FIG. 7, the encapsulating packet processing node 3E may have the configuration of the packet processing node 3 of FIG. 3 including the receiver 31, indicator processor 34 and transmitter 35. However, the layer number changer 32 of the packet processing node 3 is replaced by an encapsulator 3E2. The encapsulator 3E2 is configured to change the number of layers of a packet by encapsulating the packet within a further packet. The encapsulating and encapsulated packets from which the encapsulated packet is formed may comprise a packet received and/or a packet generated by the encapsulating packet processing node 3E. Furthermore, the determining function of the indicator processor 34 may determine whether the packet resulting from encapsulation contains a monitoring indicator and, if so, in which protocol layer, the indicator processor 34 being configured to copy or move any detected monitoring indicator(s) to the lowest protocol layer of the packet resulting from encapsulation. The processor 34 may further be configured not to copy an indicator if the determiner 33 indicates that the monitoring indicator is already present in the lowest layer of the resulting packet.

Figure 8:
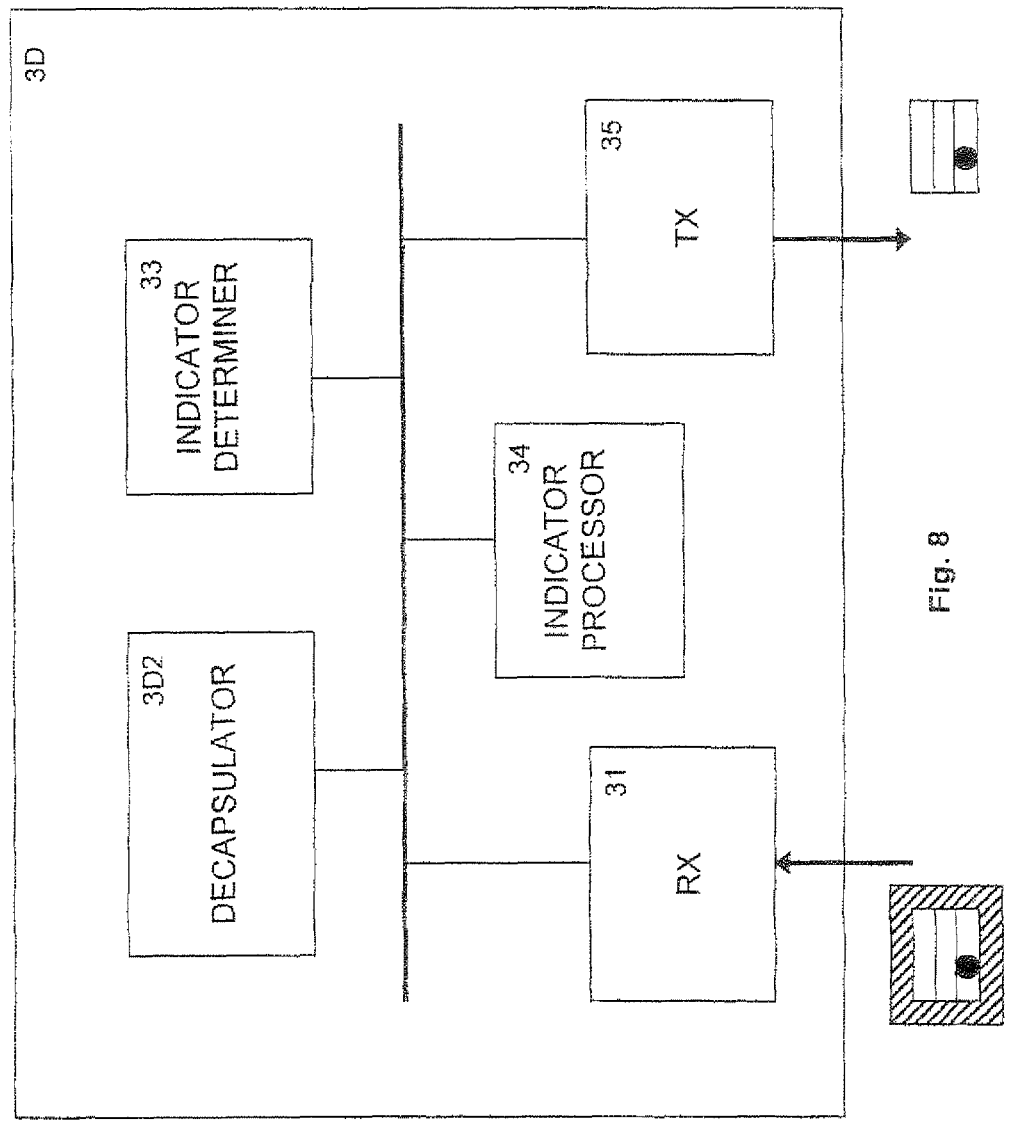
FIG. 8 shows notional functional units of which an decapsulating packet processing node 3D may be configured.

FIG. 8 shows a decapsulating packet processing node 3D, which may be an additional node in the system embodiment or may constitute the above packet processing node 3. As shown in FIG. 8, the decapsulating packet processing node 3D may have the configuration of the packet processing node 3 of FIG. 3 including the receiver 31, indicator processor 34 and transmitter 35. However, the layer number changer 32 of the packet processing node 3 is replaced by a decapsulator 3D2. The decapsulator 3D2 is configured to change the number of layers of a packet by decapsulating a smaller packet from within the received packet. The determining function of the indicator processor 34 may determine whether the received packet contains a monitoring indicator and, if so, in which protocol layer, the indicator processor 34 being configured to copy or move any detected monitoring indicator(s) to the lowest protocol layer of the packet resulting from decapsulation. The processor 34 may further be configured not to copy an indicator if the determiner 33 indicates that the monitoring indicator is already present in the lowest layer of the resulting packet.

In view of the above, the implementation of marking and monitoring rules in the invention may have the advantage of providing improved traffic monitoring through packet marking based network assisted filtering.

For example, an embodiment may allow user-oriented performance measures (e.g. end-to-end packet delay, call setup time) to be produced and to enable sophisticated fault localization. For such advantages, a user's signalling and data traffic may need to be monitored at two or more nodes/interfaces in the network. This user tracking requires the harmonization of filtering at the measurement points. The harmonization can be done based on common identities (e.g. IMSI (International Mobile Subscriber Identity)).

Unfortunately, in a conventional system, these identities are not available in every node and signalling phase. Furthermore, none of these identities are present in each packet of a user in a conventional system. Consequently, the capture hardware of a conventional system would have to maintain a mapping table and perform a table lookup for each packet on a possibly Gbps link in order to achieve such advantages.

Figure 9:
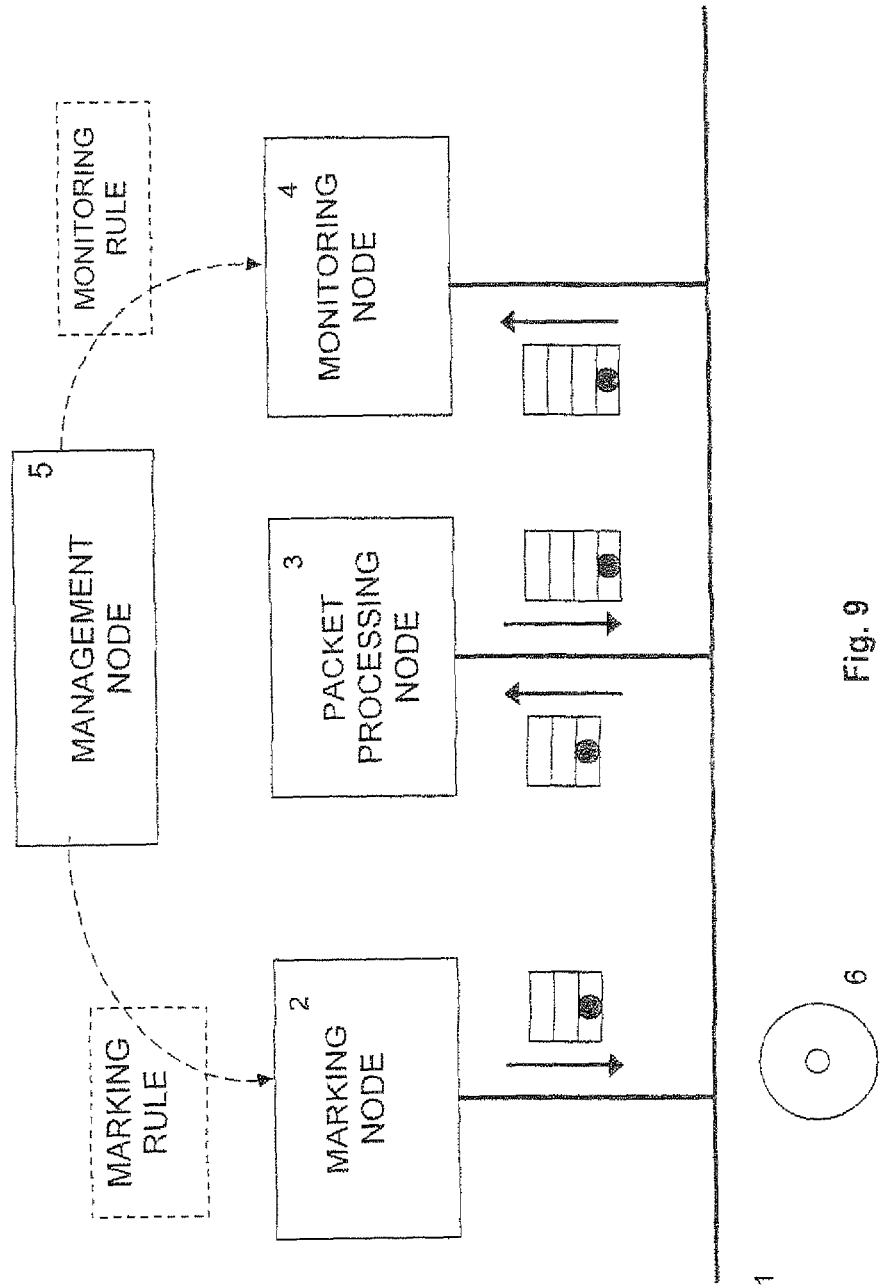
FIG. 9 shows the system embodiment of FIG. 1 further comprising a management node 3 and/or a storage medium 6.

FIG. 9 shows that the system embodiment of FIG. 1 may further include a management node 5 for transmitting a marking rule to the marking node 2 and/or for transmitting a monitoring rule to the monitoring node 4.

The monitoring rule may instruct the monitoring node 4 to monitor data transport on the basis of, e.g., all received packets that have an indicator in the lowest protocol layer, all received packets that have a predetermined indicator in the lowest layer, or all received packets having an indicator in the lowest layer that links the packet, e.g. by means of a look-up table or database, to a particular flow.

The monitoring rule may further specify processing to be carried out on the monitoring indicators of the packets having, e.g., the specified indicator or type of indicator in the lowest protocol layer. Such processing may be merely formatting to output the indicators in a format receivable by an external processor, or a specific form of statistical processing of the indicators, e.g., regarding time of arrival, transport route taken, error rate, missing packet rate.

Particularly advantageously, the management node 5 may be for transmitting a complementary pair of marking and monitoring rules to one or more respective pairs of marking and monitoring-nodes 2, 3, such that one or more different monitoring functions within the system can be changed dynamically and synchronously across one or more routes extending between marking and monitoring nodes.

FIG. 9 further shows that the system may additionally include a storage medium 6 having computer program instructions stored therein for configuring each of one or more programmable units to perform as one or more of the nodes of an embodiment. Such a programmable unit may be a computer containing, in a conventional manner, one or more processors, memories and input/output devices.

Figure 10:
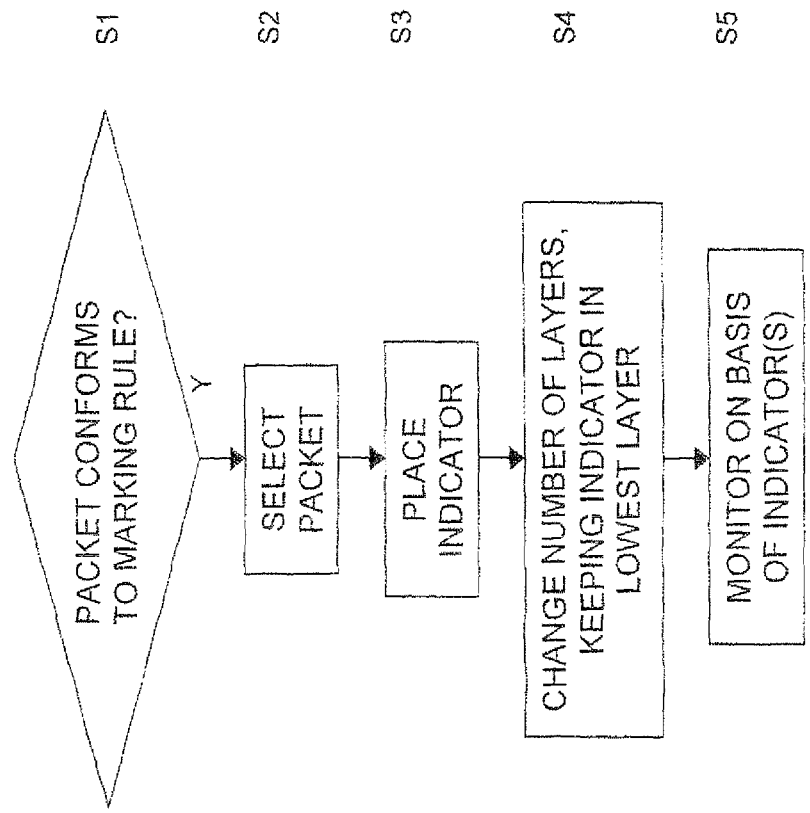
FIG. 10 shows a flow diagram of a method that may be performed by the apparatus of the first embodiment.

The flowchart of FIG. 10 shows processing that may be performed by the apparatus of the first embodiment previously described. For example, the steps S1-S3 may be performed in the marking node 2, while steps S4 and S5 may be performed in the packet processing node 3 and monitoring node 4, respectively. However, such an arrangement is merely an example and the steps S1-S4 or the steps S4+S5 may be performed in the same node, or all of steps S1-S5 may even be performed in the same node.

The method may begin with the step S1 of determining whether a packet conforms to a marking rule. If it does, the packet is selected in step S2.

The marking rule may specify to select, e.g., only packets containing data linking the packet to a particular flow, or only a specific packet identified by an identifier of its flow and its packet number within the flow, to select packets randomly, or even to select all packets. For the latter case, a marking node may be configured to not perform a conformity determination as such if the current rule specifies that all packets are to be selected.

Furthermore, the marking rule may specify in which layer the mark is to be placed in a packet selected to be marked. Further still, the marking rule may be introduced anytime according to, e.g., application, user, bearer type, terminal type, etc.

In view of the above, all of the packets of a complete flow may be marked with the same monitoring indicator. Alternatively, packets of the same flow can be marked according to, e.g., different bearer types. Thus, both a per packet marking and a per flow marking are advantageously possible.

Each packet on which a conformity determination is performed as described above may be generated in a marking node 2 or may alternatively be received from a further network node, e.g., a user terminal or an edge node interfacing with a neighbouring network, or any marking, packet processing or monitoring node associated with a further instance of the invention within communications system, e.g., connected to network 1.

The marking rule may be hard-wired into the node that performs the marking, may be read into the node from a storage medium 6, or alternatively may be received by the node in a signal from a remote apparatus, e.g., a management node 5. An advantage of the latter alternative is that, if the network is aware of the events that happen in the network, it can support many marking rules depending on what events trigger the initial marking (i.e., filter criteria could be radio specific or application specific events, etc.).

When a packet has been selected, the method proceeds to step S3, wherein a monitoring indicator is placed in the lowest protocol layer (which may be the only protocol layer) of the packet. In other words, the packet is marked.

For the marking of a packet and/or the propagation of the packet, an optional IP field of an IP transport layer can be used to carry the monitoring indicator. In this case, the operator can define what the optional field means and the same field can even be used for several different pairs of corresponding marking and monitoring rules.

Further advantageously, a field, e.g., of an IP transport layer, that has a variable number, or a sufficient fixed number, of bits may be used so that separate marking and monitoring corresponding to a variety of respective of criteria, e.g., VoIP applications, user groups with the same user ID, etc., can be carried out for the same packet(s).

In step S4, the number of protocol layers of the packet is changed, i.e., increased or reduced, and the monitoring indicator is placed in the lowest layer of the resulting packet by copying or moving the indicator. (No 'placing' as such may be performed if the indicator is already in the lowest layer in the packet with the changed number of layers).

In step S5, transport of data is monitored on the basis of the indicator(s) in packet(s) that have been processed according to steps S1-S4.

Thus, since the step S4 has ensured that the monitoring indicator is in the lowest layer of the packet, and provided that the indicator is kept in the lowest layer in all subsequent nodes prior to step S5, the monitoring in step S5 only needs to look at the lowest layer of each received packet.

Particularly advantageously, this means that parsing of received packets is not required in a monitoring node. For example, only the transport headers may be examined.

Furthermore, since the monitored packets are only those that were selected according to a monitoring rule in previous steps S1, S2, the embodiment may have the advantage that not all traffic is captured at a monitoring node (which may be a network interface, so that the obtained traffic traces do not become huge within a short time. Where this advantage is not achieved, it is challenging to handle the huge capture files, and thus measurement intervals need to be shortened. This may result in several compromises because, for certain types of events (e.g., subscribers attaching to the network, initiating communication, handover, etc.), much less can be observed during a shorter time period. For example, it may no longer be possible to analyze some longer term statistics such as daily profiles.

In more detail, filtering/processing of traffic in a capture device, in real time during the traffic capture, risks the stored traffic trace becoming of a reasonable size, even for long measurement durations. Then, the capturing device will then face challenges, because bitrates of monitored links can be in the order of several Gbps already and, furthermore, the utilization of these links constantly increases. Even if the capturing device incorporated specialist hardware, it is likely that the capabilities of filtering/processing algorithms it can run in real time are limited. Real-time signalling of filtering information between monitoring points to overcome this would need to meet very strict delay requirements.

The monitoring results output by an embodiment of the invention may comprise a stream of read indicators, preferably in a format processable in an external data processing node. Further preferably, the read indicators may be accompanied by time stamps of arrival time at the monitoring node. Alternatively, the results may comprise statistics calculated in the output generator concerning packet drop rate, e.g., if the read indicators comprise packet sequence numbers such that the monitoring node is able to detect a missing packet in a stream of packets comprising a single communication. Further alternatively, the results may comprise an alarm signal if missing packets are detected and it is thereby determined in the monitoring node that a problem may have occurred in a downstream node/link. Further alternatively, the results may comprise a signal to indicate that all packets of a single communication have been received at the monitoring node, this advantageously indicating that there may be a lack of diversity of routes in use in a network. Naturally, these are only examples of results that may be obtained from the monitoring node and the skilled person will readily conceive of other monitoring results obtainable by use of the invention.

Further advantageously, the above embodiment may be applied at any stage in the transport of a flow. For example, the marking by with a monitoring indicator can be carried out at any node in the transport route of a flow (e.g., in the sending node where the packet or flow originates or at any point thereafter) and the monitoring may take place at any point subsequent to the marking, e.g., before the packet or flow reaches its destination. Furthermore, the monitoring indicator may be placed in any packet of flow, i.e., the marking with the indicator is not necessarily restricted to the first packet of a flow. Thus, an embodiment can be applied to intermediate packet(s) of a flow of packets and to an intermediate section of the route of the packet(s) between source and destination.

SECOND EXAMPLE EMBODIMENT

The second embodiment contains the elements of FIG. 1, namely a marking node 102, a packet processing node 103 (e.g., 103X, 103Y) and a monitoring node 104.

While the second embodiment may fit well to the case where all interfaces are IF based, since the functionality of the embodiment is not radio access or core technology specific, it could be introduced in various types of networks, e.g., SAE/LTE.

According to the second embodiment, the necessary information for filtering at a monitoring node is placed in packet headers at the transport layer. This is significantly different from existing marking based solutions, because it can be applied in specific multi-layer environments, such as e.g., 3G (Third Generation) networks. In such an environment, tunneling and bearers are used because of mobility and radio related processing. In such a case, besides IF packet marking, node support according to an embodiment allows the marking to be propagated in the network and to keep the marking always in the lowest IF transport layer in order to enable simple identification of flows to be observed. This way, the filtering of the data to be captured for further analysis may be reduced to a simple flag check in the marked packets.

The proposed network elements of the second embodiment may further imply functions to enable the introduction and propagation of filtering criteria.

Thus, network functions, which can take a significant part of the filtering task that arises during monitoring, possibly at two or more monitoring points, may advantageously enable monitoring of traffic of selected users. An advantageous concept is to keep in mind the observability of the network from the design phase and construct the network from such elements which support this.

Since the volume of control plane packets (i.e., signaling messages) is much smaller than that of user plane packets, the following discussion of the second embodiment focuses on user plane traffic. It is nevertheless feasible to record all signaling traffic. Since user plane traffic is between client peers (e.g., in case of telephony) or between a client and a server (e.g., for video streaming), packet marking based filtering fits this type of traffic better than signaling traffic, where network nodes also generate messages.

Figure 11:
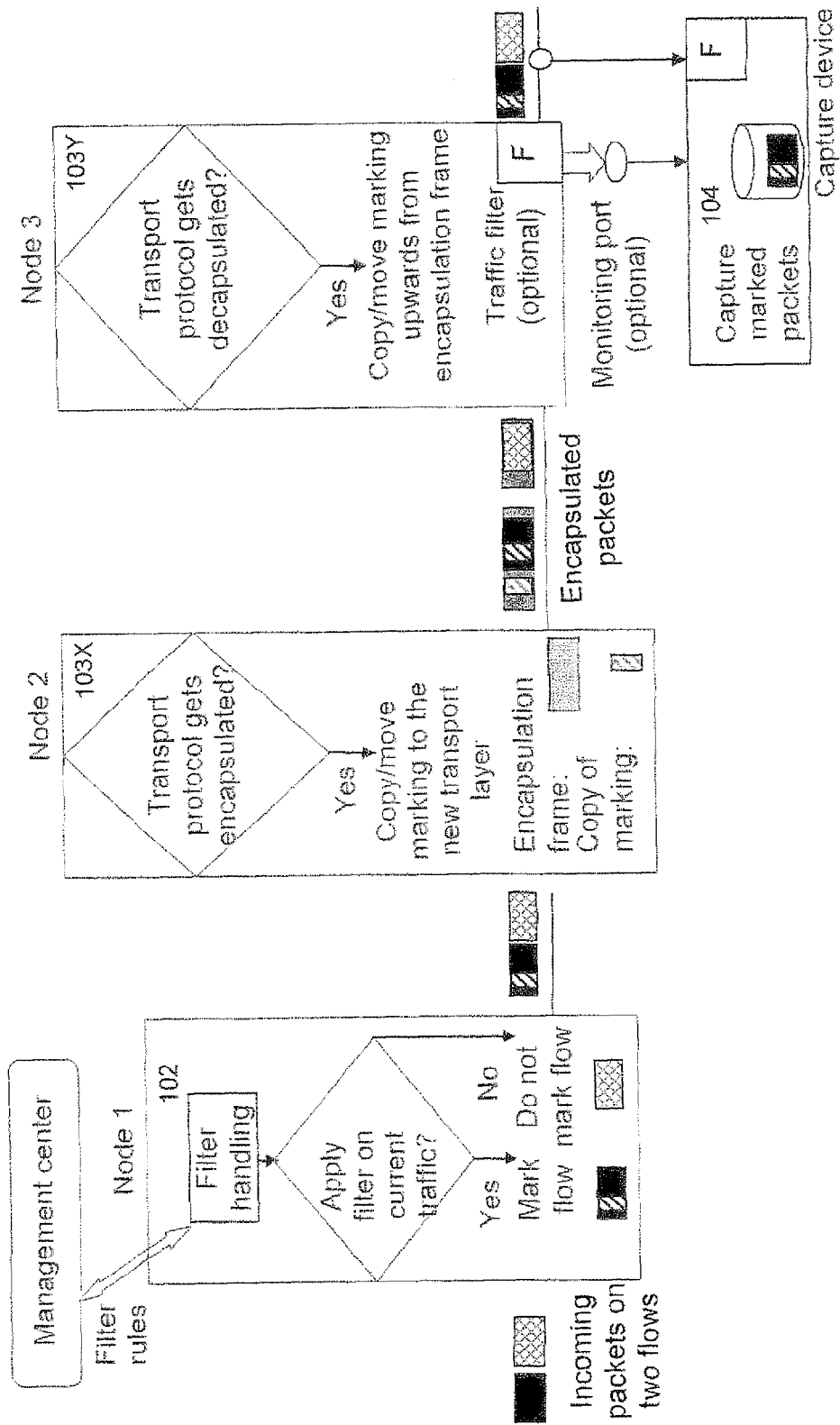
FIG. 11 shows a second embodiment, including optional marking of an encapsulation header.
Figure 12:
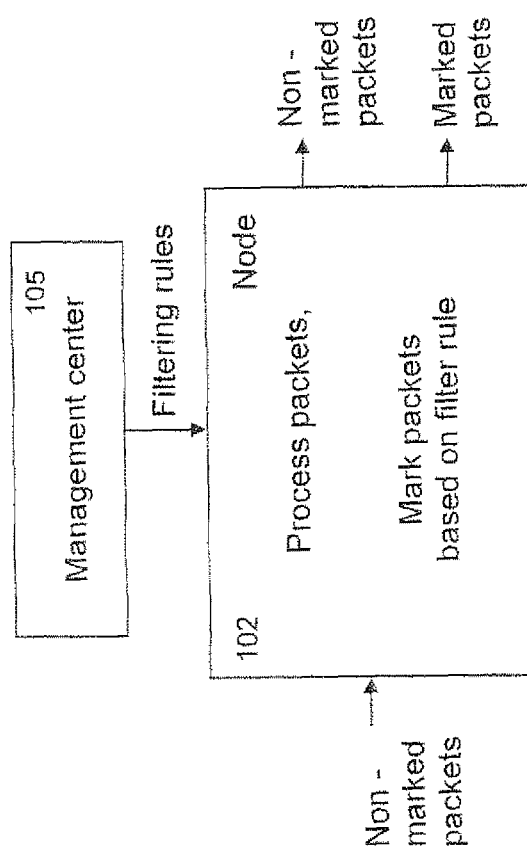
FIG. 12 shows a management center and node of the second embodiment.

In the second embodiment, a telecommunications network can be regarded as a collection of traffic handling nodes and a management center (node) 105. The embodiment extends the existing functionality of such a network as follows:

the management center 105 is able to define monitoring jobs, and is able to communicate the derived filtering rules to the nodes 102 (e.g., marking node and/or monitoring node) before the start of monitoring (see FIG. 12).

a network node 102 (e.g., marking node) can handle the filtering rule the management center has communicated to it and, based on its current knowledge about the system, it marks the network traffic on the current transport layer which matched a specific filtering rule (see FIG. 11).

Furthermore, FIG. 12 shows that, in the second embodiment, network nodes 102 can mark packets based on filtering rules (marking rules) obtained from a management center (management node) 105.

Thus, the second embodiment may advantageously allow tracking of the passing through time of packets in, e.g., an RNC Radio Network Controller). In other words, the embodiment may allow packet-level—rather than connection-oriented—monitoring such that any part of the information and not 'connections' in some part of the network can be monitored.

Figure 13:
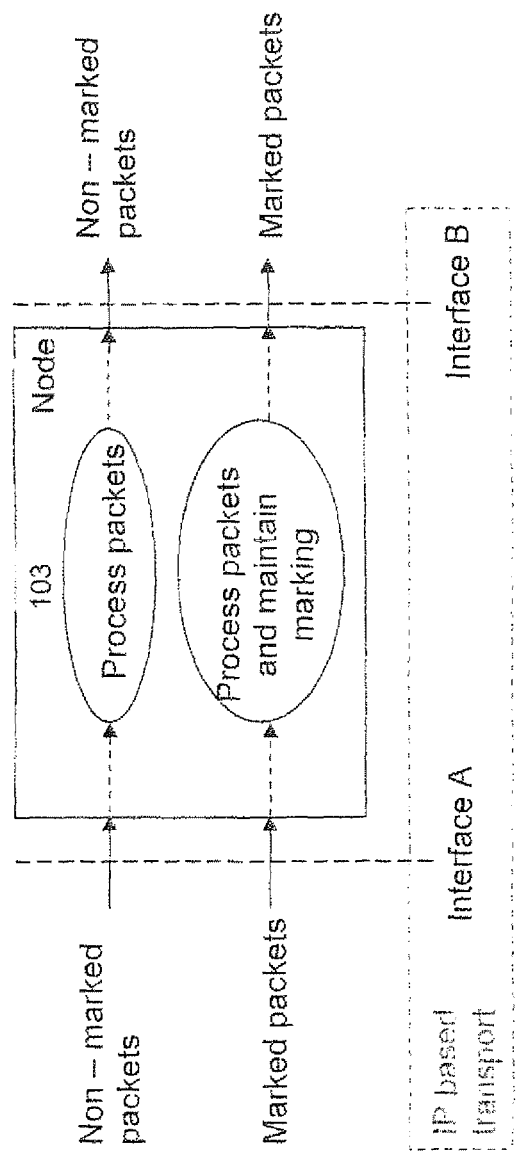
FIG. 13 shows how, in the second embodiment, network nodes may be able to maintain packet markings.

Propagation of Marking in the Second Embodiment:

Network nodes 103 (packet processing nodes) may process packets in various ways, including segmentation and reassembly, decapsulating and encapsulating according to new protocol headers/trailers, fragmentation, etc. Since the marking (i.e., monitoring indicator) needs to be propagated through the node, such a node should be able to propagate the markings seen at incoming interfaces towards outgoing interfaces. Thus, a network node 103 should be prepared to preserve the marking whatever processing takes place (see FIG. 13).

Advantageously, the marking can be done within the 3GPP (Third Generation Partnership Project) domain such that it is not seen outside of the observed, network.

The following describes optional techniques for propagation of marking in relation to encapsulation, decapsulation and segmentation.

A. Propagation of Marking Regarding Encapsulation/De-Capsulation:—

During pass-through of network traffic on network nodes 103, new protocol layers may encapsulate or decapsulate the original traffic. Thus, the original marking which the transport layer holds has to be propagated among the new layers.

FIG. 11 shows propagation of packet marking, wherein the encapsulation header is marked.

If a marked packet becomes encapsulated, the propagation may be achieved by, e.g., also marking the encapsulation header (see FIG. 11). While such marking may consume resources during pass-through, an advantage is that deep protocol parsing is not needed to subsequently extract an inner marking.

Options for Marking an Encapsulation Header Include:
the marking is moved into the encapsulation header. This may have the advantage that the packet size remains constant. However, if the encapsulation header is subsequently removed from the packet, then the marking may need to be moved back to the lower protocol layer; and
the marking is copied into the encapsulation header. This may have the advantage that there is no need to deal with the moving back of the marking if the encapsulation is removed.

B. Propagation of Marking Regarding Segmentation:—

If a marked packet gets segmented into more packets, all resulting packets take over the marking.

The management center 105 may ask nodes 103 to communicate the marked traffic to an external monitoring device 104 (monitoring node), or the monitoring device 104 may itself filter the traffic based on the marking of the transport protocol (see right-hand side of FIG. 11). Further data and/or identifier correlation is not necessary for the filtering of the traffic at a node or capturing device.

One may note that there is a trade-off between the complexity of on-line filtering and the amount of additional processing nodes should do in order to support packet marking propagation. If packet markings can pass through the network, the filtering possibility becomes available at each point in the network.

If all nodes support the filtering procedure by propagating the marking in the outer IP header (i.e., the lowest IF layer) as described above or in FIGS. 11 and 13, on-line filtering may advantageously require a low processing effort. Therefore, a preferred (but not the only) option is to have maximum support from the nodes in order to simplify filtering.

Depending on the size of the used marking field, it is possible to apply more filters at the same time.

Location of Marking in the Second Embodiment:

Referring more specifically to, e.g., cellular mobile networks, the following concerns the location of marking in optional techniques of the second embodiment.

In current all-IP networks, IP packets are communicated among hosts and servers and, even if tunneling or transport bearers are used, there is IP connectivity in the transport layer as well (see e.g., IF based Iub, Iu and Gn interfaces in 3GPP cellular network). Therefore, an appropriate place for the packet marking may be in the IP header.

Where the monitoring indicator is a single bit, there are more possibilities for the location of the indicator:
the options field of the IP header in the IP transport layer. The marking of a packet would need to extend the IP header with four bytes (this may be the minimum), modify the IP header length field, and recalculate the CRC (Cyclic Redundancy Check) checksum on the IP header as it implies the option fields as well;
the identification field in the IP header. For example, one bit of the 16-bit field could be used for marking; and
the Type of Service (TOS) field. For example, one bit of the 8-bit TOS field could be used for marking.

In the case of 3G networks, the marking procedure would typically within the 3GPP network, where in the local IF transport layer yet unused parts of the IP header are free to be used without violating any protocol rules.

For example, one could set in the GGSN (Gateway GPRS (Generic Packet Radio Service) Support Node) which IMSIs to observe. The GGSN would mark the selected packets in the IP transport layer of the Go interface. Other 3GPP nodes (SGSN (Serving GPRS Support Node), RNC (Radio Network Controller)) would propagate the markings appropriately. In this case, packet markings would not be visible outside the 3GPP network at all.

Since marking is propagated through the network preferably in the lowest possible networking (e.g., IP) layer, it may advantageously be very easy to capture marked information at any point in the network. The capture/monitoring device does not need to parse the protocols and apply possibly complex filtering rules on-line during capture.

A first modification of the second embodiment filters on specific application type:

As an example, let us suppose that the VoIP traffic of the user has to be analyzed and thus a trace containing only the VoIP traffic would be useful. In case of a cellular mobile network, a suitable trace can for example be collected by capturing packets carried over the Gn or the Gi interface.

In the first modification, the client may be capable of marking packets generated by VaiI) applications and placing the marking in the IP header options field. After this, the IP is segmented, encapsulated, and sent over the radio interface. (Note that the application should not necessarily be VoIP and that marking could take place in a server or at IMS as well.)

The next time when we consider using the IP header is in the UTRAN where the radio interface traffic is prepared to be relayed to the core network through the Iu-PS interface. A GTE (GPRS Tunneling Protocol) tunnel is created between the UTRAN and SGSN, which is encapsulated with an IP layer. The new functionality which has to be supported by the RNC is to make it possible to check the transported IP header and transpose the marking to the new transporting IP layer.

The marked packet is transported to the SGSN which relays the traffic to the proper GGSN. During the passing through of the original IP packet on the SGSN, the packet is decapsulated from the RNC-SGSN tunnel, and encapsulated with the proper addressed IP layer to send it through the SGSN-GGSN tunnel. The extended functionality of the SGSN is that it supports transposition of the marking during the relay process.

The GGSN obtains a marked packet on the Gn interface, and from now on the original packet sent by the MS (Mobile Station) is available. The GGSN acts as a router towards the Internet and can transpose the marking to the IP layer it uses on the Gi interface.

In the previous use case, the Iu-PS, Gn or Gi interface can be captured and the filtering applied based on the marking of the IP header options field.

A second modification of the second embodiment filters on specific users:

In this regard, it is noted that the packet marking concept can be used more generally than as described above. Any network node 102 that is capable of marking packets based on any criteria extends the current network's capabilities. For example, if the Node B (the name of the base station in 3G) is capable of marking the packets, then with the same concept described in relation to the first modification above, filtering of the user's traffic of specific cells may advantageously become possible (e.g., even in the core network).

A third modification of the second embodiment tracks user IP packets in HS:

In the context of HSDPA (High Speed Downlink Packet Access), if an IP packet arrives in downlink direction to the RNC, it gets buffered, segmented, placed into the RLC (Radio Link Control) buffer, encapsulated according the RLC and MAC (Medium Access Control) framing, etc. Finally the packets are sent out towards a Node B at the Iub interface. Due to this substantial processing, it is hard to find which IP packets at the Iu-PS interface correspond to which IP packets at the Iub interface (we consider IP based Iub). It is very cumbersome, for example to measure the time taken to process the packet in the RNC and send it down to the Node B. It is therefore advantageous if the RNC can propagate marking of Iu-PS IP packets to Iub IP packets, which may further advantageously make possible correlation with measurements at other points, e.g., in the core network.

Figure 14:
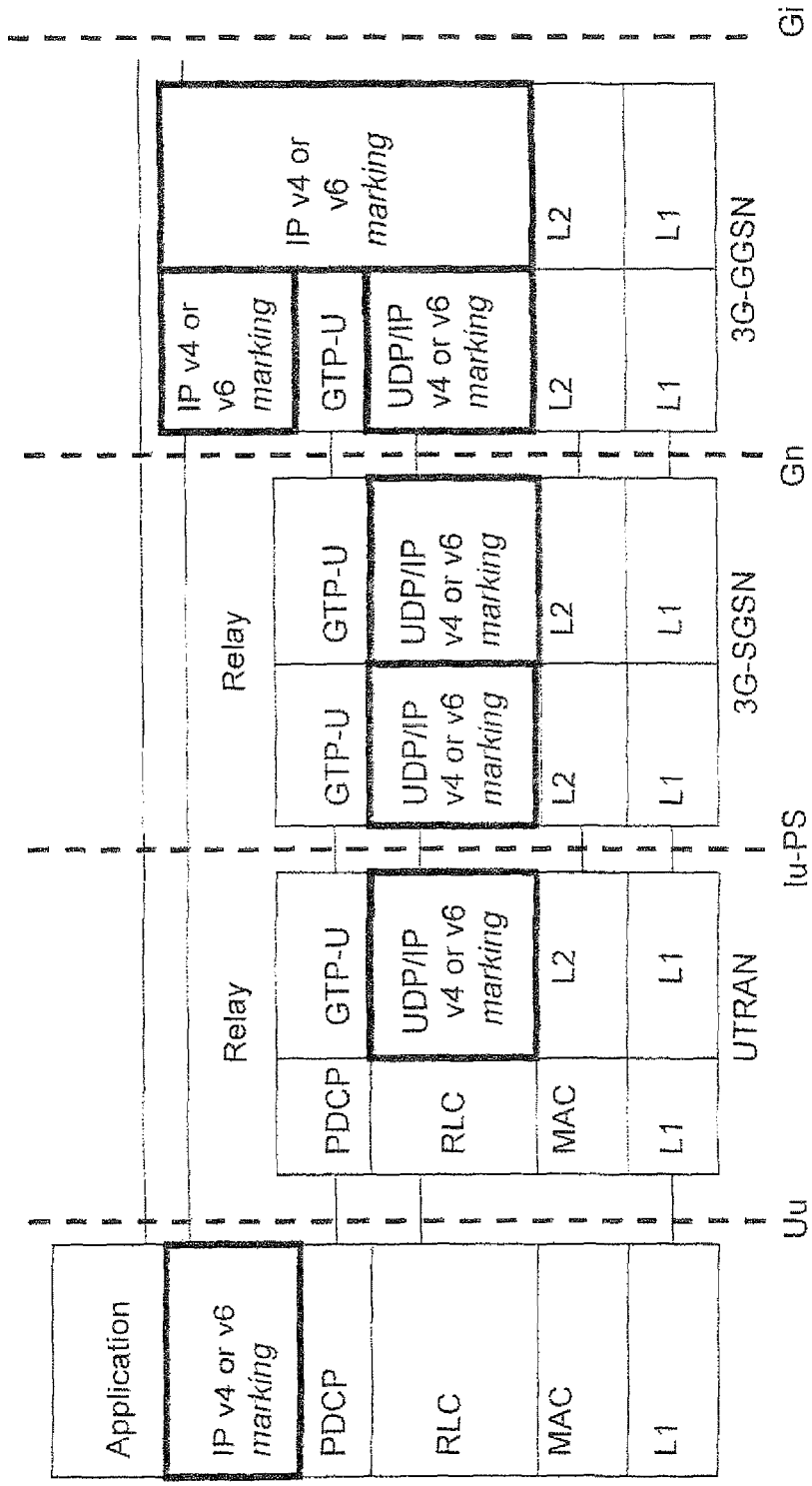
FIG. 14 shows that the second embodiment may involve a PS (Packet Switched) Domain User Plane protocol stack.

A further modification of the second embodiment may involve a PS Domain User Plane protocol stack with network support such that marking is propagated into IP (Internet Protocol) based transport interfaces Iu-PS, Gn, and Gi. In this regard, FIG. 14, wherein, e.g., L1 and L2 are layers, shows that such a modification may advantageously enable easy filtering at these interfaces.

The above descriptions of embodiments refer to the lowest protocol layer in which a monitoring indicator is placed and propagated. This lowest layer is preferably the lowest Internet Protocol transport layer. However, it may be the lowest layer of any other networking transmission protocol. Further still, the layers of the particular protocol comprising said lowest layer may be encapsulated by layers of a further, different protocol.

The invention has been described with reference to non-limiting and example embodiments. It is to be appreciated that the invention can comprise the features of the various embodiments, the features being taken singly, severally or collectively.

The invention claimed is:

1. A monitoring system for monitoring transport of data through interconnected nodes for processing data packets in a communication system, wherein said data packets conform to a layered transmission protocol, the monitoring system comprising:
   a marking node configured to:
   a) select a data packet having a first number of protocol layers according to a marking rule and marking the selected packet by placing in the lowest protocol layer of the first number of protocol layers a monitoring indicator for identifying that said selected packet is to be used for said monitoring; and
   b) output said marked data packet;
   at least one packet processing node configured to:
   a) receive said marked data packet;
   b) form a data packet based on said received marked data packet such that said formed data packet comprises a second number of protocol layers that is different from said first number of protocol layers, where the lowest protocol layer of the second number of protocol layers is at a different and lower protocol layer of the lowest protocol layer of the first number of protocol layers, and such that said indicator added by said marking node is moved or copied from the lowest protocol layer of the first number of protocol layers to the lowest protocol layer of the second number of protocol layers of said formed data packet; and
   c) output said formed data packet; and
   a monitoring node configured to monitor said transport of data on the basis of the indicators in data packets that have passed through the at least one packet processing node.

2. The system of claim 1, wherein said monitored data transport is transport of data of the selected packet or of a flow of said selected packet.

3. The system of claim 1, wherein the system has at least one segmenting packer processing node configured to:
   a) receive a data packet having in a protocol layer a monitoring indicator for indicating that said received packet is to be used for said monitoring;
   b) form data packets by segmenting said received data packet into a plurality of data packets, such that said indicator is placed in the lowest protocol layer of each of said formed data packets; and
   c) output said formed data packets,
   wherein said monitoring node is configured to monitor said transport of data on the basis of the indicators in data packets that have passed through said at least one segmenting packet processing node.

4. The system of claim 1, wherein the system has at least one assembling packet processing node configured to:
   a) receive a data packer having in a protocol layer a monitoring indicator for indicating that said received packet is to be used for said monitoring;
   b) form a data packet by combining a plurality of data packets such that said indicator is placed in the lowest protocol layer of said formed data packer; and
   c) output said formed data packet, and
   wherein said monitoring node is configured to monitor said transport of data on the basis of the indicators in data packets that have passed through said at least one assembling packet processing node.

5. The system of claim 1, wherein the system has at least one encapsulating packet processing node configured to:
   a) receive a data packet having in a protocol layer a monitoring indicator for indicating that said received packet is to be used for said monitoring;
   b) form a data packet by encapsulating said received data packet within said formed data packet, such that said indicator is placed in the lowest protocol layer of said formed data packet; and
   c) output said formed data packet, and
   wherein said monitoring node is configured to monitor said transport of data on the basis of the indicators in data packets that have passed through said at least one encapsulating packet processing node.

6. The system of claim 1, wherein said lowest protocol layer is the lowest Internet Protocol transport layer.

7. The system of claim 1, wherein said lowest protocol layer is a TCP/IP transport layer and said at least one packer processing node si configured to place said indicator in the IP options field of a header, in the Type of Service field of a header or in an unused part of a header, said header being an IP header of said TCP/IP transport layer.

8. The system of claim 1, further comprising a management node configured to transmit to said marking node data defining said marking rule and/or communicating a monitoring rule to said monitoring node.

9. A monitoring method for monitoring transport of data through interconnected nodes for processing data packers in a communication system, wherein said data packets conform to a layered transmission protocol, the monitoring method comprising:

in a marking node:
- a) selecting a data packet having a first number of protocol layers according to a marking rule and marking the selected packet by placing in the lowest protocol layer of the first number of protocol layers a monitoring indicator for identifying that said selected packet is to be used for said monitoring; and
- b) outputting said marked data packet;

in at least one packet processing node:
- c) receiving said marked, data packet;
- d) forming a data packet based or, said received marked data packet such that said formed data packet comprises a second number of protocol layers that is different from said first number of protocol layers, where the lowest protocol layer of the second number of protocol layers is at a different and lower protocol layer of the lowest protocol layer of the first number of protocol layers, and such that said indicator added in said marking node is moved or copied from the lowest protocol layer of the first number of protocol layers to the lowest protocol layer of the second number of protocol layers of said formed data packet; and
- e) outputting said formed data packet; and in a monitoring node, monitoring said transport of data on the basis of the indicators in data packets that have passed through the at least one packet processing node.

10. The method of claim 9, wherein said monitored data transport is transport of data of the selected packet or of a flow of said selected packet.

11. The method of claim 9, comprising:

in at least one segmenting packet processing node:
- a) receiving a data packet having in a protocol layer a monitoring indicator for indicating that said received packet is to be used for said monitoring;
- b) forming data packets by segmenting said received data packet into a plurality of data packets, such that said indicator is placed in the lowest protocol layer of each of said formed data packets; and
- c) outputting said formed data packets, and in said monitoring node, monitoring said transport of data on the basis of the indicators in data packets that have passed through said at least one segmenting packet processing node.

12. The method of any of claim 9, comprising in at least one assembling packet processing node:
- a) receiving a data packet having m a protocol layer a monitoring indicator for indicating that said received packet is to be used for said monitoring;
- b) forming a data packet by combining a plurality of received data packets, such that said indicator is placed in the lowest protocol layer of said formed data packet; and
- c) outputting said formed data packet, and in said monitoring node, monitoring said transport of data on the basis of the indicators in data packets that have passed through said at least one assembling packet processing node.

13. The method of claim 9, comprising:

in at least one encapsulating packet processing node:
- a) receiving a data packet having in a protocol layer a monitoring indicator for indicating that said received packet is to be used for said monitoring;
- b) forming a data packet by combining a plurality of 'received data packets ⁄such that said indicator is placed in the lowest protocol layer of said formed data packet; and
- c) outputting said formed data packet, and in said monitoring node, monitoring said transport of data on the basis of the indicators in data packets that have passed through said at least one encapsulating packer, processing node.

14. The method of claim 9, further comprising a management node transmitting to said marking node data defining said marking rule and/or communicating a monitoring rule to said monitoring node.

15. The method of claim 9, wherein said lowest protocol layer is the lowest Internet Protocol transport layer.

* * * * *

UNITED STATES PATENT AND TRADEMARK OFFICE
CERTIFICATE OF CORRECTION

PATENT NO.        : 8,514,723 B2
APPLICATION NO.   : 12/996434
DATED             : August 20, 2013
INVENTOR(S)       : Malomsoky et al.

It is certified that error appears in the above-identified patent and that said Letters Patent is hereby corrected as shown below:

In the Specification:

In Column 1, Line 22, delete "as voice" and insert -- a voice --, therefor.

In Column 3, Line 36, delete "35" and insert -- 3S --, therefor.

In Column 3, Line 44, delete "node 3" and insert -- node 5 --, therefor.

In Column 4, Line 11, delete "any" and insert -- at any --, therefor.

In Column 5, Line 11, delete "IF" and insert -- IP --, therefor.

In Column 6, Line 21, delete "for" and insert -- 21 for --, therefor.

In Column 6, Line 50, delete "and" and insert -- 33 and --, therefor.

In Column 6, Line 62, delete "determiner 31" and insert -- determiner 33 --, therefor.

In Column 10, Line 65, delete "interface," and insert -- interface) --, therefor.

In Column 11, Line 61, delete "IF" and insert -- IP --, therefor.

In Column 12, Line 5, delete "IF" and insert -- IP --, therefor.

In Column 12, Line 8, delete "IF" and insert -- IP --, therefor.

In Column 12, Line 52, delete "Radio" and insert -- (Radio --, therefor.

In Column 13, Line 50, delete "IF" and insert -- IP --, therefor.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,514,723 B2

In Column 13, Line 65, delete "IF" and insert -- IP --, therefor.

In Column 14, Line 14, delete "IF" and insert -- IP --, therefor.

In Column 14, Line 20, delete "Go" and insert -- Gn --, therefor.

In Column 14, Line 39, delete "Vail)" and insert -- VoIP --, therefor.

In Column 14, Line 47, delete "GTE" and insert -- GTP --, therefor.

In the Claims:

In Column 16, Line 20, in Claim 3, delete "packer" and insert -- packet --, therefor.

In Column 16, Line 35, in Claim 4, delete "packer" and insert -- packet --, therefor.

In Column 16, Line 40, in Claim 4, delete "packer; and" and insert -- packet; and --, therefor.

In Column 16, Line 63, in Claim 7, delete "packer" and insert -- packet --, therefor.

In Column 16, Line 64, in Claim 7, delete "si" and insert -- is --, therefor.

In Column 17, Line 6, in Claim 9, delete "packers" and insert -- packets --, therefor.

In Column 18, Line 10, in Claim 12, delete "of any of claim" and insert -- of claim --, therefor.

In Column 18, Line 12, in Claim 12, delete "m a" and insert -- in a --, therefor.

In Column 18, Line 29, in Claim 13, delete "'received data packets $_f$ such" and insert -- received data packets, such --, therefor.

In Column 18, Line 35, in Claim 13, delete "packer," and insert -- packet, --, therefor.